United States Patent [19]

Imanaka et al.

[11] 4,348,456

[45] Sep. 7, 1982

[54] ABRASION-RESISTANT LAMINATED FILM

[75] Inventors: Yoshihiko Imanaka; Yoichi Saito, both of Hino; Akihiro Horike, Musashino, all of Japan

[73] Assignee: Teijin Limited, Osaka, Japan

[21] Appl. No.: 227,102

[22] PCT Filed: Apr. 17, 1979

[86] PCT No.: PCT/JP79/00097

§ 371 Date: Dec. 17, 1980

§ 102(e) Date: Dec. 17, 1980

[87] PCT Pub. No.: WO80/02255

PCT Pub. Date: Oct. 30, 1980

[30] Foreign Application Priority Data

Sep. 28, 1977 [JP] Japan ................. 52-115509

[51] Int. Cl.$^3$ ................. B32B 27/30; B32B 27/36
[52] U.S. Cl. ................. 428/336; 204/159.23; 526/261; 428/412; 428/422.8; 428/483; 428/518; 428/520; 428/522; 428/473.5; 428/411; 428/510; 428/476.1
[58] Field of Search ................. 428/422.8, 483, 412, 428/336, 522, 476.1, 473.5, 510, 520, 518, 334, 335; 526/261; 204/159.23

[56] References Cited

U.S. PATENT DOCUMENTS

| | | | |
|---|---|---|---|
| 2,934,525 | 4/1960 | Feketo | 526/261 |
| 3,803,088 | 4/1974 | Gardeski | 428/422.8 |
| 3,927,695 | 12/1975 | Crockwell | 428/422.8 |

FOREIGN PATENT DOCUMENTS 48-29880 4/1973 Japan.
49-125380 11/1974 Japan.

Primary Examiner—Ellis P. Robinson
Attorney, Agent, or Firm—Sughrue, Mion, Zinn, Macpeak & Seas

[57] ABSTRACT

A thermoplastic resin film laminate. A thermoplastic film is made abrasion-resistant by coating or laminating (A) one or both sides of a thermoplastic resin film with (B) a vinyl polymer composed mainly of a cyanurate ring-containing (meth)cyanurate having a structure corresponding to the condensation product of 1 mole of cyanuric acid with 3 moles, on the average, of a hydroxyl group-containing (meth)acrylate represented by the formula C $H_2$=CR—COO—$R^{10}$—OH (wherein R is hydrogen atom or methyl group; and $R^{10}$ is an alkylene group having a carbon number of 2 to 4), or a cyanurate ring-containing (meth)acrylate having a structure corresponding to the condensation product of 1 mole of cyanuric acid with 2 moles or more and less than 3 moles, on the average, of the above hydroxyl group-containing (meth)acrylate and not more than 0.5 mole, on the average, of a polyhydric alcohol of the formula $R^{20}$—(—OH)$_y$ (wherein $R^{20}$ is a 2-4 valent saturated hydrocarbon group having a carbon number of 2 to 6, wherein a part of said carbon atoms may be replaced by oxygen atoms forming ether linkages; y is an integer of 2 to 4). The vinyl polymer layer has excellent abrasion resistance and flexibility. The thermoplastic resin film laminate can be used, for example, as a shatter-proof film for window glass, a sunlight-controlling film, a heat radiation reflective film, a plastic mirror, a label, an agricultural film, etc.

6 Claims, 1 Drawing Figure

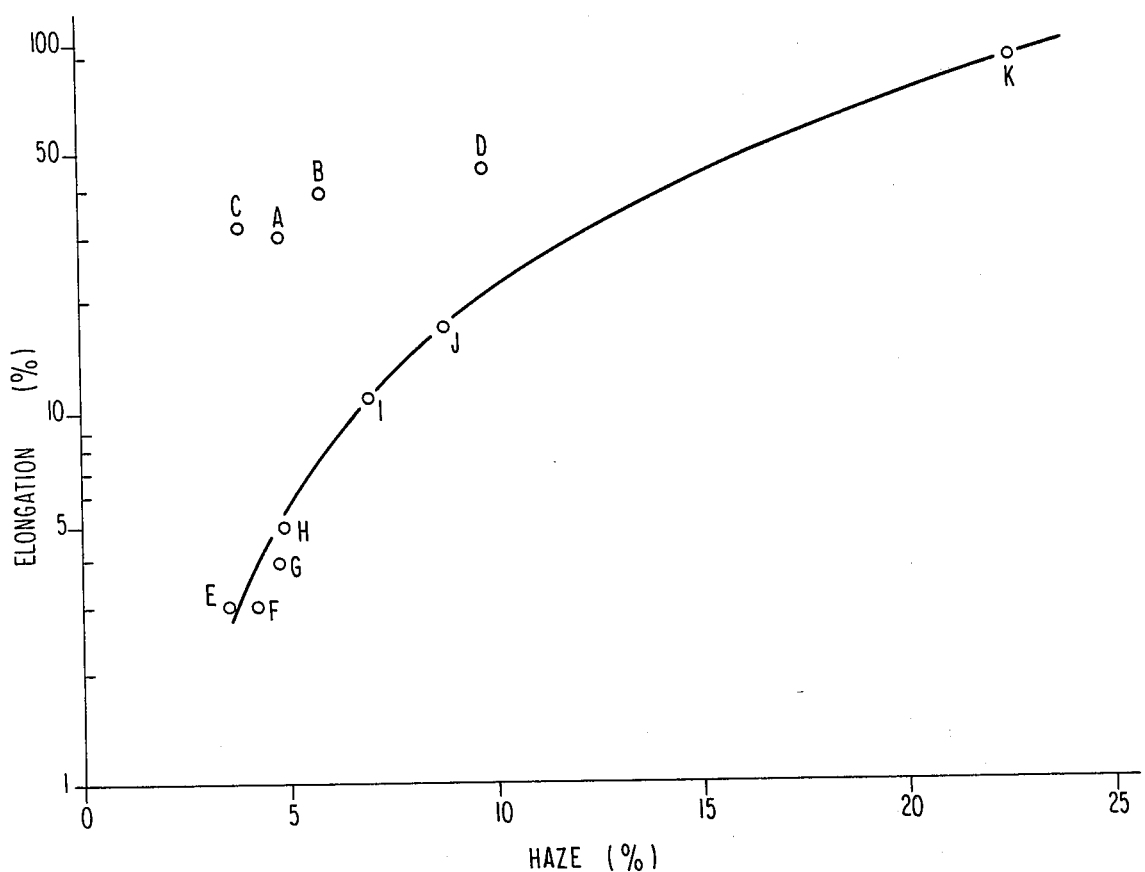

ABRASION-RESISTANT LAMINATED FILM

FIELD OF THE INVENTION

The present invention relates to a thermoplastic resin film laminate coated or laminated with a vinyl polymer composed mainly of a (meth)acrylate containing a cyanurate ring.

BACKGROUND OF THE INVENTION

It is well known that thermoplastic resin molded articles generally have poor abrasion resistance and are easily damaged with dust or by scratching, because of their soft surface. The minute surface scratches reduce the surface gloss, transparency, and smoothness, and deteriorate the appearance of the molded article. Such phenomena remarkably reduce the practical value of the molded article, especially the film of the thermoplastic resin, and the improvement of abrasion resistance of a thermoplastic resin molded article has long been desired.

Several means are proposed to improve the abrasion resistance of a thermoplastic resin molded article (for example, film, sheet, etc.). Examples of such means are, application of an inorganic coating layer to the surface, for example, by the vacuum deposition of inorganic glass, $SiO_2$, metal oxides, etc., or by the coating of a condensate of a hydrolyzable silicon compound to the surface (as disclosed in the specifications of Japanese Patent Laid-open No. 52-25880, Japanese Patent Publication No. 53-39915, Japanese Patent Laid-open No. 53-97098, etc.), and application of an organic coating layer by coating the surface with a polyfunctional (meth)acrylate followed by curing the (meth)acrylate layer with electron rays, ultraviolet radiation or heat.

Although the inorganic coating layer gives a considerable abrasion resistance to the molded article, it has a drawback of cracking caused by stretching, compressing or bending because of its extremely low degree of elongation.

The application of the polyfunctional (meth)acrylate coating layer can be carried out, e.g. by the method disclosed in the specifications of Japanese Patent Laid-open Nos. 49-30466, 53-2567, and 53-102936, or by the use of a compound of the "NK-ester" series (Trade name of Shinnakamura Kagaku KK) known as a reactive crosslinking agent; however, the apparently incompatible requirements of high abrasion resistance and high elongation cannot be satisfied by the above methods because the high abrasion resistance inevitably results in the low elongation, and vice versa, in the above methods.

The isocyanurate ring-containing acrylate compounds disclosed in the Japanese Patent Laid-open No. 48-29880 are not yet satisfactory to give a laminate having sufficiently high abrasion resistance and elongation. The specification of the Japanese Patent Laid-open No. 49-125380 in which the method for the preparation of cyanurate ring-containing (meth)acrylates is disclosed, describes the film prepared by curing the cyanurate ring-containing (meth)acrylate thus obtained is either a "hard and rather brittle" film or a soft one.

DISCLOSURE OF THE INVENTION

As a result of the extensive investigation on the preparation and properties of cyanurate ring-containing (meth)acrylate conducted by the inventors for the purpose of obtaining a laminate having a high abrasion resistance as well as an excellent flexibility, the inventors have found that the thermosetting resin film laminate prepared by the use of a compound which is disclosed in the specification of the Japanese Patent Laid-open No. 49-125380 as the one giving a "hard and rather brittle" film, has a tough coating layer having a high elongation and an excellent abrasion resistance. The present invention provides a thermoplastic resin film laminate obtained by coating and laminating one or both sides of a thermoplastic resin film with a vinyl polymer composed mainly of at least one compound selected from the cyanurate ring-containing (meth)acrylate represented by the general formula I:

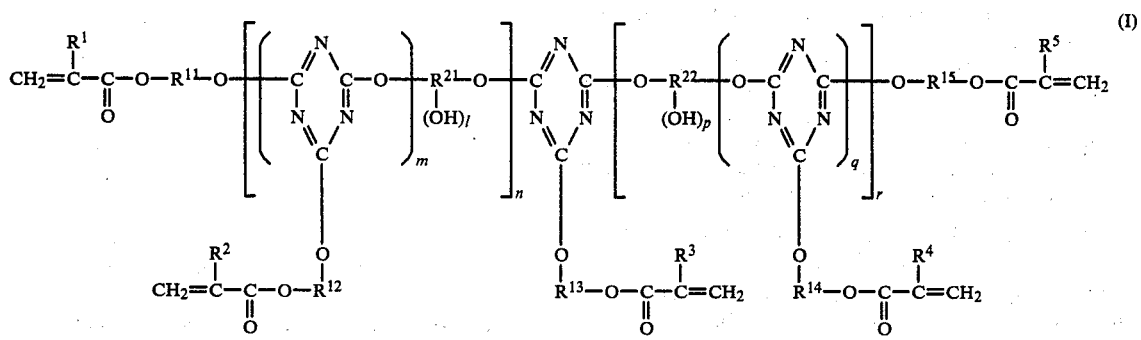

wherein $R^1$–$R^5$ each represents a hydrogen atom or a methyl group; $R^{11}$–$R^{15}$ each represents an alkylene group having a carbon number of 2–4; $R^{21}$ and $R^{22}$ each represents a 2–4 valent saturated hydrocarbon group having a carbon number of 2–6, wherein a part of the carbon atoms may be replaced by oxygen atoms forming ether linkages; m is 1 or 2, and l is 0, 1, or 2, provided that (l+m+1) is an integer of 2–4; n is 0 or an integer of 1–3, preferably 0 or 1; q is 1 or 2, and p is 0, 1, or 2, provided that (p+q+1) is an integer of 2–4; r is 0 or an integer of 1–3, preferably 0 or 1.

In other words, the thermoplastic resin film laminate of the present invention is the one obtained by coating one or both sides of a thermoplastic resin film with a vinyl polymer composed mainly of at least one polyfunctional compound selected from cyanurate ring-containing (meth)acrylate having a structure corresponding to the condensation product of 1 mole of cyanuric acid with 3 moles of a hydroxyl group-containing (meth)acrylate represented by the general formula (1)

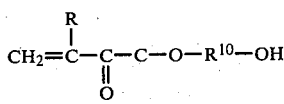

(1)

wherein R is hydrogen atom or methyl group; and $R^{10}$ is an alkylene group having a carbon number of 2-4 and those having a structure corresponding to the condensation product of 1 mole of cyanuric acid with 2 moles or more and less than 3 moles of the hydroxyl group-containing (meth)acrylate of the general formula (1)

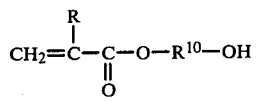

(1)

wherein R is hydrogen atom or methyl group; and $R^{10}$ is an alkylene group having a carbon number of 2-4 and not more than 0.5 mole of a polyhydric alcohol of the general formula (2)

$$R^{20}\text{-}(OH)_y \ldots \quad (2)$$

wherein $R^{20}$ is a 2-4 valent saturated hydrocarbon group having a carbon number of 2-6, wherein a part of said carbon atoms may be replaced by oxygen atoms forming ether linkages; y is an integer of 2-4

THE BRIEF EXPLANATION OF THE DRAWING

The FIGURE represents the relationship between the haze value (%), after the Taber abrasion test, of polyethylene terephthalate films coated with various acrylate compounds (the compound A of the Example 1, the compounds B–D of the Examples 2–4, and the compounds E–K of the Comparative Examples 1–7) cured by ultraviolet irradiation, and the degree of elongation to cause the cracking in the coating layers.

BEST MODE FOR CARRYING OUT THE INVENTION

The cyanurate ring-containing (meth)acrylate used in the present invention is described as follows.

As is well known, the cyanurate ring is a structure denoted by the formula (3)

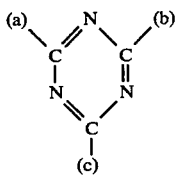

(3)

wherein all or a part of the bonding links (a), (b), and (c) are bonded with the residues of (meth)acryloyl group-containing compounds.

The (meth)acryloyl group-containing compound is the above-mentioned compound of the formula (1), wherein R is hydrogen atom or methyl group, preferably hydrogen atom in order to attain the higher curability. The group R corresponds to the $R^1$–$R^5$ in the general formula (I).

The $R^{10}$ is an alkylene group having 2–4 carbon atoms, and corresponds to the $R^{11}$–$R^{15}$ in the general formula (I). When the carbon number of the $R^{10}$ group is 5 or more, the abrasion resistance of the resulting laminate becomes poor. Concrete examples of the $R^{10}$ group are, —$CH_2.CH_2$—, —$CH_2.CH(CH_3)$—, —$CH_2.CH_2.CH_2.CH_2$—, and —$CH_2.C(CH_3)_2$—, preferably —$CH_2.CH_2$— and —$CH_2.CH(CH_3)$— in respect of the availability of the raw materials, and especially —$CH_2.CH_2$— to attain the best polymerizability in the preparation of the laminate and the highest abrasion resistance of the laminate thus prepared.

The $R^{20}$ group in the polyhydric alcohol component $R^{20}\text{-}(OH)_y$ is a saturated hydrocarbon group having 2–4 valencies and 2–6 carbon atoms wherein a part of said carbon atoms may be replaced by oxygen atoms forming ether linkages. The $R^{20}$ group corresponds to the $R^{21}$ and $R^{22}$ groups in the general formula (I), and y corresponds to (1+m+1) or (p+q+1). In this case, again, too many carbon atoms in the $R^{20}$ gives poor abrasion resistance to the laminate. The concrete examples of the $R^{20}\text{-}(OH)_y$ are; ethylene glycol, propylene glycol, 1,3-propanediol, 1,4-butanediol, neopentyl glycol, diethylene glycol, glycerol, trimethylolpropane, and pentaerythritol. The hydrogen atom of such polyhydric alcohols may be substituted by a halogen atom to improve the flame-retardancy.

The compound having a structure corresponding to a condensation product of 1 mole of cyanuric acid and 3 moles of the hydroxyl group-containing (meth)acrylate of the general formula (I) is represented by the formula (4)

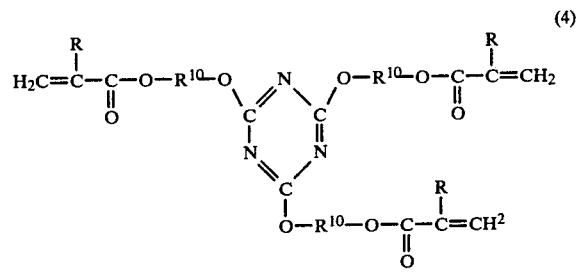

(4)

wherein R and $R^{10}$ have the same meanings as defined above

It is important in these compounds, similar to the cyanurate ring-containing (meth)acrylate which will be described later, that the compounds are free of chlorine atom originated from cyanuric chloride used as a raw material, and it can be achieved by the careful selection of the reaction conditions which will be described later.

The structure corresponding to the condensation product of 1 mole of cyanuric acid with 2–3 moles of the aforementioned hydroxyl group-containing (meth)acrylate and not more than 0.5 mole of a polyhydric alcohol of formula $R^{20}\text{-}(OH)_y$, is formed by bonding the linkages (a), (b) and (c) of the cyanurate ring of the formula (3) with oxygen atoms originated from the hydroxyl groups of the hydroxyl group-containing (meth)acrylate or oxygen atoms originated from the hydroxyl groups of the polyhydric alcohols $R^{20}\text{-}(OH)_y$. Accordingly, the practically obtained cyanurate ring-containing (meth)acrylate is a single compound or a mixture of compounds having various structures depending upon the reaction conditions such as the ratio of the charged raw materials, the order of the charging, the reaction temperature, etc.

Two extremely simple cases of the cyanurate ring-containing (meth)acrylate are illustrated as the formulas (5) and (6), [wherein R, $R^{10}$, and $R^{20}$ have the same meanings as defined above] which correspond to the structure of a condensate of 1 mole of cyanuric acid with 2 moles of a hydroxyl groupcontaining (meth)acrylate and 0.5 mole of $R^{20}$—(—OH)$_2$, and the structure of a condensate of 1 mole of cyanuric acid with 2 moles of a hydroxyl group-containing (meth)acrylate and $\frac{1}{3}$ mole of $R^{20}$—(OH)$_3$, respectively.

taining (meth)acrylate may have a polycyclic structure wherein more than y cyanurate rings are bonded together linearly or branchedly through —O—$R^{20}$—(—O—)$_{y-1}$ linkages, or may contain unreacted hydroxyl groups of the polyhydric alcohol. Examples of such compounds are shown as the formulas (7)–(13), wherein R, $R^{10}$ and $R^{20}$ have the same meanings as

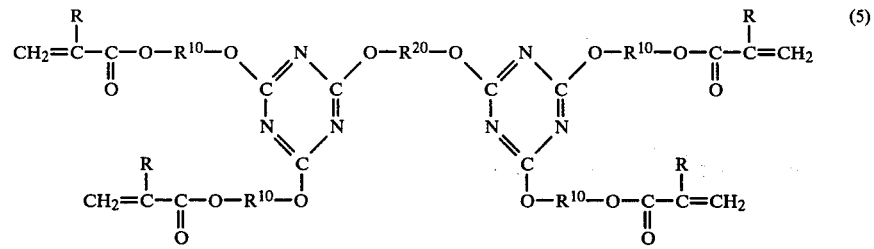

(5)

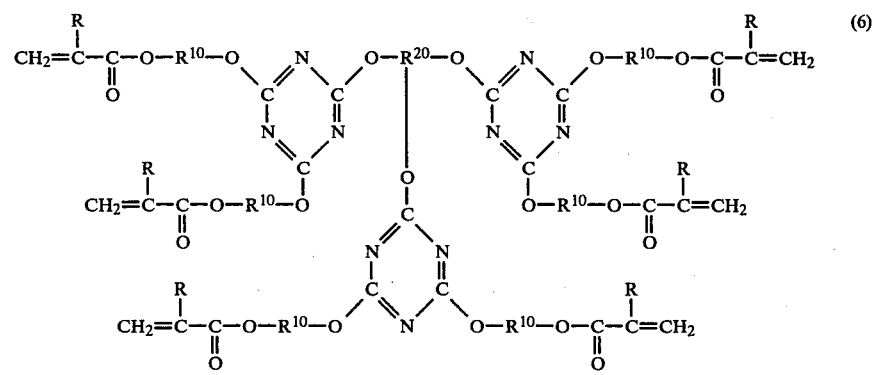

(6)

Needless to say, the present invention is not restricted in the above description, and the cyanurate ring-condefined before.

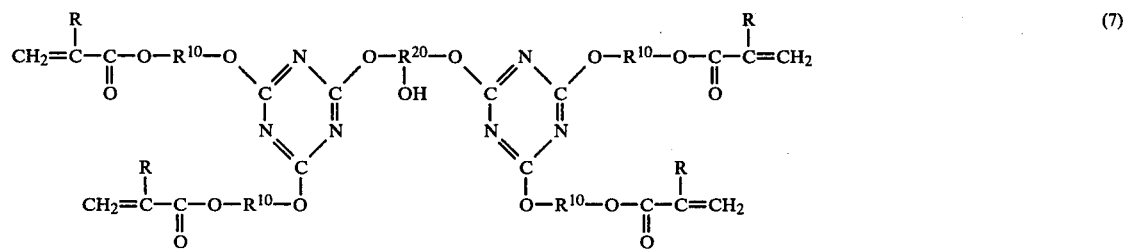

(7)

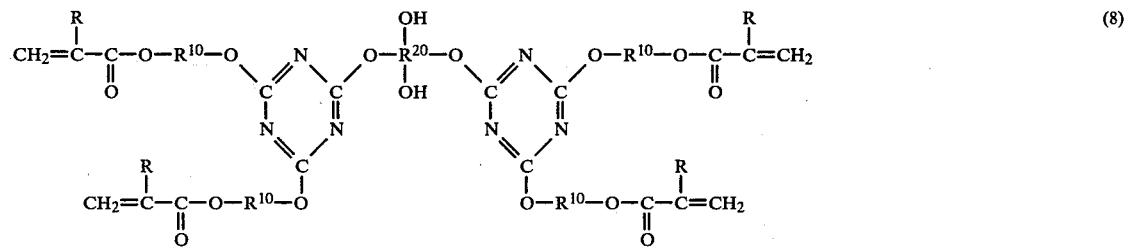

(8)

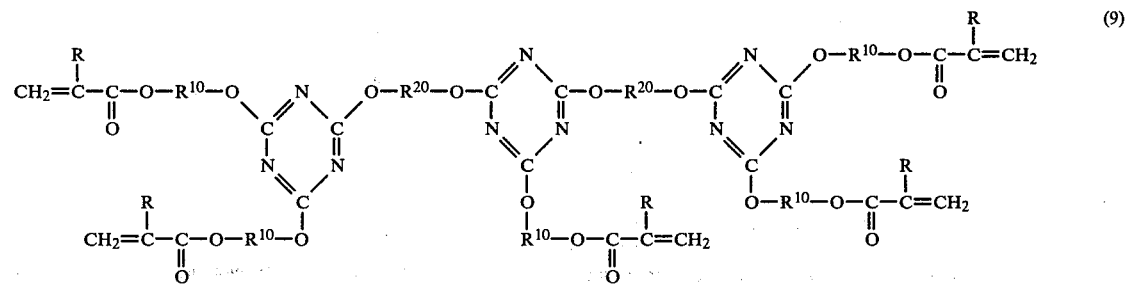

(9)

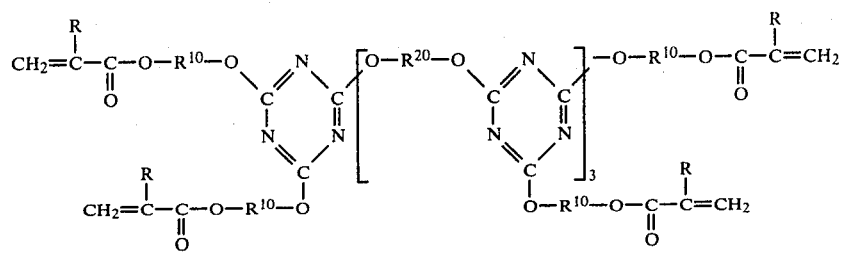
(10)
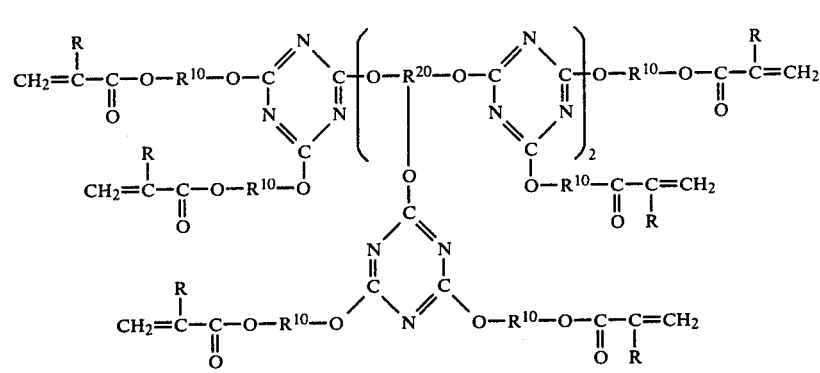
(11)
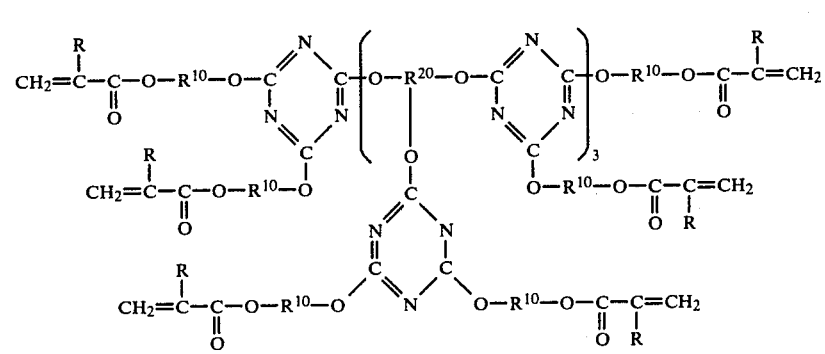
(12)
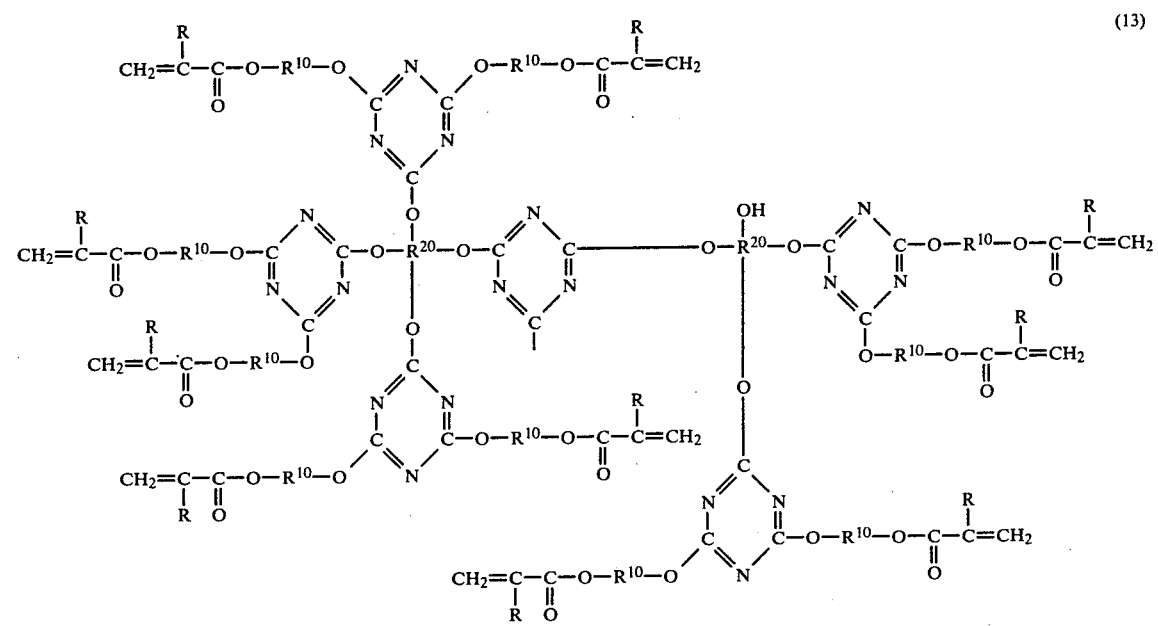
(13)
As shown above, the structure of the cyanurate ring-containing (meth)acrylate of the present invention varies widely with the molar ratios of the raw materials, and the relationship between the structure and the molar ratios can be easily pictured by any person having common knowledge in the field.

The average number of the (meth)acryloyl group per one molecule of the cyanurate ring-containing (meth)acrylate having the above structure is preferably three or more in view of the curability and the abrasion resistance, and the average molar number of the polyhydric alcohol per one mole of the cyanurate ring is preferably 0.5 or less in view of the prevention of gelation as well as the above view points. The polyhydric alcohol does not form a ring by the reaction of its two or more OH groups in a molecule with one cyanuric acid.

The cyanurate ring-containing (meth)acrylate compound can be prepared basically by the method disclosed in the specification of Japanese Patent Laid-open No. 49-125380.

Since the reaction of the above method is carried out in a solvent (for example, chloroform or benzene) using 1.0-1.5 times equivalent of (meth)acrylate based on cyanuric chloride, usually more than 2-3 weight % of active chlorine atoms originated from the acid chloride of the cyanuric chloride are left unsubstituted in the product, and the cyanurate ring-containing (meth)acrylate compound thus obtained gives a cured product having poor durabilities such as moisture resistance, water resistance, and weather resistance.

Accordingly, the cyanurate ring-containing (meth)acrylate which answers the purpose of the present invention may contains, for example, essentially not more than 1 weight %, preferably not more than 0.5 wegiht % of chlorine atoms originated from the acid chloride group.

Such a compound essentially free from chlorine atom can be prepared by the substitution reaction of cyanuric chloride with a hydroxyl group-containing compound in the presence of an inorganic strong base such as sodium carbonate and sodium hydroxide as an acid acceptor, in the absence of a solvent at 60°-120° C., preferably 80°-100° C., using the hydroxyl group of more than 1.5 times, preferably more than 2 times stoichiometric amount based on the chlorine atom of the cyanuric chloride.

The reaction proceeds apparently as a heterogeneous reaction at the initial stage; however, a small amount of cyanuric chloride dissolves in the hydroxyl group-containing compound and reacts in the solution in the presence of a large excess amount of the hydroxyl groups based on the chlorine atom of cyanuric chloride. When two or more kinds of hydroxyl group-containing compounds are used as the reactant, the reaction proceeds rapidly corresponding to the ratio of the amounts of the charged compounds. Since the reaction is carried out in the absence of solvent using the hydroxyl group-containing compound of more than 1.5 times stoichiometric amount based on the charged cyanuric chloride, there remains a large excess amount of hydroxyl groups based on the chlorine atoms of the unsubstituted cyanuric chloride even at the final stage of the reaction, which, together with the high reaction temperature and the presence of a strong acid acceptor, completes the substitution reaction almost completely and eliminates essentially the unreacted chlorine atoms of the acid chloride.

To prevent the gelation, the reaction is preferably carried out in the presence of 50-5000 ppm of a polymerization inhibitor such as hydroquinone, 2,6-di-tert-butyl-p-cresol, N-nitrosodiphenylamine, p-methoxyphenol, phenothiazine, and copper powder.

The reaction time depends upon the ratio of the amounts of the reactants, the kind of the acid acceptor, the reaction temperature, etc., and is usually 1-20 hours, preferably 2-10 hours.

The unreacted raw materials and produced inorganic salts can be removed from the reaction mixture and the desired compound is obtained only by distilling away the excessive hydroxyl group-containing compound in vacuo, washing the residue with water if necessary after diluting with a solvent especially when the system is too viscous, separating the organic layer, and distilling away the solvent from the organic layer. When, as often happens, the excessive hydroxyl group-containing compound is highly soluble in water, the objective compound can be obtained without using the above procedures only by washing the reaction mixture directly with water.

The raw material of the thermoplastic resin film which is the substrate of the laminate, is, for example, aromatic polyesters such as polyethylene terephthalate, polytetramethylene terephthalate, and polyethylene 2,6-naphthalenedicarboxylate; polyolefins such as polyethylene and polypropylene; polyamides such as nylon-6, nylon-6,6, nylon-12,and poly-m-phenylene isophthalamide; polyimides such as poly-N,N'-(p,p'-hydroxydiphenylene)pyromellitic imide; cellulose derivatives such as cellulose triacetate; polycarbonates such as poly(p,p'-isopropylidene diphenylene)carbonate; polyvinyl chloride; polystyrene; acrylic ester copolymers; methacrylic ester copolymers; polyethers; polyester ether resins; their copolymers and their polyblends.

It is often desirable to draw the film, especially biaxially, to improve the mechanical, thermal, and optical properties and the dimensional stability thereof.

The laminate of the present invention is composed basically of a flexible base film, for example, the above thermoplastic resin film of usually not more than 500 microns thickness and a vinyl polymer coating layer composed mainly of the above cyanurate ring-containing (meth)acrylate and having a thickness of 0.5-15 microns, preferably 1.0-10 microns.

Although the cyanurate ring-containing (meth)acrylate of the present invention has a low polymerization shrinkage and accordingly a low curling tendency compared to those of the other known polyfunctional acrylate, it is recommended to avoid a too thick coating layer to cause the curling phenomenon. Too thick coating layer results in the undesirably low flexibility of the film without improving the abrasion resistance, while too thin layer gives poor abrasion resistance. The above thickness range has been defined by considering these restrictions.

The laminate of the present invention can be manufactured by coating one or both sides of the above thermoplastic resin film with a coating liquid composed mainly of the above cyanurate ring-containing (meth)acrylate, and polymerizing the coating liquid on the film. To improve the adhesivity of the film to the vinyl polymer, the film may be subjected to the pretreatment, for example, corona discharge treatment, plasma treatment, glow discharge treatment, flame treatment, ultraviolet or electron irradiation, ozone oxidation, and hydrolysis, or to the precoating with an adhesive layer.

The coating liquid is composed of at least one compound selected from the above cyanurate ring-containing (meth)acrylates, and if necessary, a polymerization initiator, a polymerization inhibitor as a storage stabilizer, and other additives. The liquid may be diluted with a proper organic solvent.

The objective of the dilution with said solvent is to control the viscosity of the coating liquid or to improve the wettability of the liquid to the film. Concrete examples of the solvent are; hydrocarbons such as benzene, toluene, xylene, ethylbenzene, n-hexane, petroleum ether, ligroin, and cyclohexane; halogenated hydrocarbons such as methylene chloride, chloroform, trichlene, ethylene dichloride, perchlene, 1,1,1-trichloroethane, chlorobenzene, and bromoform; alcohols such as methanol, ethanol, isopropanol, n-butanol, amyl alcohol, ethylene glycol, propylene glycol, ethylene glycol monomethyl ether, ethylene glycol monoethyl ether, and diethylene glycol monomethyl ether; ketones such as acetone, methyl ethyl ketone, methyl isobutyl ketone, and cyclohexanone; ethers such as ethyl ether, isoamyl ether, diethylene glycol dimethyl ether, triethylene glycol dimethyl ether, tetrahydrofuran, dioxane, anisole, and phenetole; nitriles such as acetonitrile and propionitrile; esters such as ethyl formate, methyl acetate, ethyl acetate, isopropyl acetate, amyl acetate, methyl benzoate, and ethyl benzoate; aprotic polar solvents such as N,N-dimethylformamide, N,N-dimethylacetamide, N-methylpyrrolidone, and dimethyl sulfoxide; and water. The solvent may be used singly or as a mixture.

The kind of the polymerization initiator depends upon the curing means. Examples of the polymerization initiator for ultraviolet curing are benzophenone; benzoin ethers such as benzoin, benzoin methyl ether, and benzoin ethyl ether; benzyl ketals such as benzyl, benzyl dimethyl ketal, and benzyl diethyl ketal; 2-alkylanthraquinones; and diacetyl; and those of heat curing are azo compounds such as azobisisobutyronititle; and peroxides such as benzoyl peroxide, lauroyl peroxide, di-ter-butyl peroxide, dicumyl peroxide, and cumene hydroperoxide. When the coating liquid is cured with ultraviolet irradiation and heat, polymerization initiators of the above two groups may be used in combination. The amount of the initiator is usually 0.01-10 weight % based on the (meth)acrylate. The polymerization initiator is not necessarily required when gamma rays or electron rays are used as a curing means.

The polymerization inhibitor as a storage stabilizer which may be added to the coating liquid, is, for example, hydroquinone, hydroquinone monomethyl ether, catechol, 2,6-di-ter-butylphenol, N-nitrosodiphenylamine, and phenothiazine, and its amount is usually 10-1000 ppm based on the cyanurate ring-containing (meth)acrylate.

The coating liquid may contain other additives, for example, stabilizers such as ultraviolet light absorber and antioxidant, dyes and pigments, fluorescent dyes and pigments, and fillers such as glass fiber, calcium carbonate, colloidal silica, carbon, and clay.

Furthermore, the coating liquid may contain a proper vinyl monomer in an amount not to deteriorate the abrasion resistance and the flexibility which are the characteristics of the film laminate of the present invention (for example, not more than 40 weight %, preferably not more than 20 weight %). Examples of the monomer are, styrene, methyl methacrylate, acrylonitrile, acrylic acid, vinyl acetate, methacrylamide, 2-hydroxyethyl acrylate, tetrahydrofurfuryl methacrylate, 2-ethylhexyl methacrylate, tetramethylene glycol diacrylate, diethylene glycol dimethacrylate, polyethylene glycol dimethacrylate, trimethylolpropane triacrylate, bisallyl carbonate, diallyl phthalate, and n-butyl allyl ether.

The coating liquid can be applied (coated) to the base film by, e.g. dipping in the coating liquid, spraying with a sprayer, coating with a brush, a doctor knife, a bar coater or a roll, and transferring with a roll. All of those methods give satisfactory results.

The coating liquid applied to the surface of the base film can be polymerized as it is when the liquid is free of solvent, or polymerized after removing the solvent by heating, etc. when the liquid is diluted with a solvent. The polymerization (or curing) can be carried out with ultraviolet light, heat, gamma rays, electron rays, or their combination.

The light sources for the ultraviolet curing are, for example, a carbon-arc lamp, a low-pressure mercury-vapor lamp, a high-pressure mercury-vapor lamp, an ultra-high-pressure mercury-vapor lamp, a xenon lamp, a halogen lamp, and a chemical lamp. The time necessary to cure the liquid depends upon the kind and the intensity of the light source, the distance between the light source and the object to be cured, and the irradiation atmosphere; however, the liquid can be sufficiently cured by the ultraviolet irradiation of the order of seconds (several seconds to about ten seconds). The irradiation may be carried out at room temperature or in an atomsphere heated to an extent not to cause the deformation of the base film with heat.

Heat sources for the thermal curing are, for example, a furnace, a hot plate, hot air, infrared irradiation, and microwave irradiation. The rate of thermal curing depends largely upon the temperature conditions, and usually it is necessary to carry out the thermal curing at 80° C. or higher, preferably at 120° C. or higher for several to five minutes or more. Accordingly the process is not suitable for a substrate having low heat-resistance, such as polyvinyl chloride and polyethylene. To attain a high abrasion resistance, the thermal curing is preferably carried out in an inert gas atmosphere such as nitrogen gas or carbon dioxide gas, or preventing the system from contacting with air, especially with oxygen.

Sources of ionizing radiations are usually gamma rays radiated from radioactive isotopes such as $Co^{60}$, and electron rays radiated from an electron accelerator with an acceleration voltage of from 20 to 2000 KV. The curing with ionizing radiation is usually carried out in an inert gas atmosphere such as nitrogen gas or carbon dioxide gas at a total absorbed dose of from 0.5 to 50 Mrad. Since the radiation curing can be carried out even at a low temperature, it is suitably applied to substrates having low heat-resistance; however, the process necessitates a large-scale, expensive device.

Among the above curing means, the ultraviolet curing is most desirable in view of the practicality and the workability.

As the coated thermoplastic resin film laminate of the present invention has not only excellent surface properties, especially, excellent abrasion resistance, but also an excellent flexibility, it can be processed, treated or used under flexing, bending, stretching, or rolling conditions with little crack generation in the coating layer, and therefore, keeping the practical value of the product. Accordingly, the film laminate of the present invention can be applied as an abrasion-resistant film to a wide variety of applications as described later.

The quantitative estimation of the abrasion-resistance of the film in this invention is carried out by abrading the surface of a specimen with a Taber abrasion tester specified in ASTM-D1044-56 using the CS-10F truck wheel under a load of 500 g ×2 at 50 revolutions, and determining the increase in the haze before and after the abrasion test (haze of the specimen after abrasion minus haze of the specimen before abrasion).

The elongation in the present invention is the rate of elongation at which crack generates in the coating layer of a strip of a specimen (1 cm width and 10 cm length) stretched with a tensile tester (for example, Instron Tensile Tester®) at a rate of grip separation of 2 cm/min.

The specimen having "both high abrasion resistance and high elongation" in the present invention is the one having a haze (H %) measured by the above Taber abrasion tester, and an elongation (E %) measured by the above tensile tester which satisfy the following formula $$E \geq H^{1.4}$$

wherein $H \leq 15$ and $E \geq 10$, preferably $H \leq 10$ and $E \geq 15$, especially $H \leq 7$ and $E \geq 20$.

The invention will be illustrated more specifically by the following examples, which, however, do not restrict the scope of the invention.

All "parts" in the examples are by weight.

SYNTHETIC EXAMPLE 1

An acrylate having a structure corresponding to the condensation product of 1 mole of cyanuric acid with 3 moles of 2-hydroxylethyl acrylate.

55.3 Parts of cyanuric chloride was added to a solution consisting of 209 parts of 2-hydroxyethyl acrylate and 0.04 part of N-nitrosodiphenylamine to obtain a slurry mixture, and 95.4 parts of fine powder of sodium carbonate was added to the slurry while stirring at room temperature. The reaction system was cooled to compensate the reaction heat generated upon addition of the carbonate, and to keep below 80° C. while stirring for 1 hour. Thereafter, the reaction temperature was raised to 95° C. and stirred for 3 hours. The reaction system was provided with a vacuum distillation means, and 97 parts of 2-hydroxyethyl acrylate was distilled away by vacuum distillation at 70°–75° C. under 5 mmHg. The distillation residue was poured into about 1 liter of water under stirring. The bottom organic layer was separated, diluted with 200 ml of ethyl acetate, washed with 200 ml each of water for three times, and dried with 20 parts of magnesium sulfate. After removal of the ethyl acetate by distillation, 113 parts of a cyanurate ring-containing acrylate was obtained. The compound had the structure of tris-(2-acryloyloxyethyl) acrylate, and an infrared absorption spectrum having a peak of carbonyl group at 1725 cm$^{-1}$, those of vinyl group at 1620 and 1640 cm$^{-1}$, and of cyanurate ring at 1335 and 1560 cm$^{-1}$.

SYNTHETIC EXAMPLE 2.

An acrylate having a structure corresponding to the condensation product of 1 mole of cyanuric acid with 2 moles of 2-hydroxyethyl acrylate and 0.5 mole of diethylene glycol.

55.3 Parts of cyanuric chloride was added to a solution consisting of 69.7 parts of 2-hydroxyethyl acrylate, 15.9 parts of diethylene glycol, and 0.02 part of 2,6-di-tert-butyl-p-cresol to obtain a slurry mixture, and 95.4 parts of fine powder of sodium carbonate was added to the slurry while stirring at room temperature. The reaction system was cooled to compensate the reaction heat generated upon addition of the carbonate, and to keep the system below 50° C. while stirring for 1 hour. After stirring the system further at 90°–95° C. for 2 hours, a solution consisting of 104.5 parts of 2-hydroxyethyl acrylate and 0.02 part of 2,6-di-tert-butyl-p-cresol were added to the system, and the reaction was continued at 95° C. for 2 hours. The reaction system was provided with a vacuum distillation means, and 99 parts of 2-hydroxyethyl acrylate was recovered by distilling at 70°–75° C. under 5 mmHg vacuum. The distillation residue was poured into about 1 liter of water under stirring. The bottom organic layer was separated, diluted with 200 ml of ethyl acetate, washed with 200 ml each of water for three times, and dried with 20 parts of magnesium sulfate. After removal of ethyl acetate by distillation, 104 parts of pale yellow viscous liquid was obtained. The infrared absorption spectrum of the cyanurate ring-containing acrylate thus obtained was similar to that of the compound of the Synthetic Example 1. The nuclear magnetic resonance absorption spectrum (deutero chloroform solution) of the product had the characteristic absorption of —O—C—CH$_2$—O—CH$_2$—C—O— originated from diethylene glycol (δ: 3.6–4.0 ppm), that of —CH$_2$—CH$_2$— originated from 2-hydroxyethyl acrylate (δ: 4.1–4.8 ppm) and that of —O—CH$_2$—C—O—C—CH$_2$—O— originated from diethylene glycol (superposed to the above absorption), wherein the areal ratio of the first peak to the latter two peaks was about 1 to 5. There was no characteristic absorption of hydroxyl group, and the product was identified to be a compound having 2 acryloyloxy groups and 0.5 oxydiethylene group per 1 cyanurate ring, on the average. From the above facts, it was concluded that the product was composed mainly of the compound of the following formula:

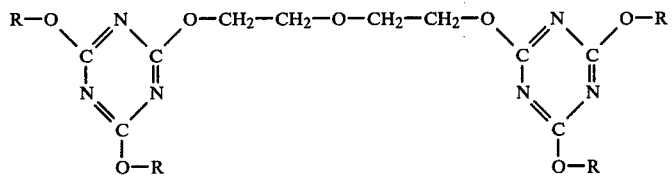

wherein —R is

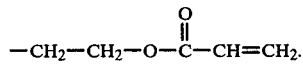

EXAMPLE 1

A coating liquid consisting of 10 parts of a cyanurate ring-containing acrylate obtained by the Synthetic Example 1 (hereinafter called as compound A), 0.15 part of benzyl dimethyl ketal, and 10 parts of methyl isobutyl ketone, was applied to the surface of a biaxially oriented (3×3) polyethylene terephthalate film having a thickness of 75 microns with a bar coater, heated at 120° C. to remove the solvent, and irradiated with a 2 KW high-pressure mercuryvapor lamp for 2 minutes in air at a distance of 25 cm. The cured coating film was 3 microns in thickness, and scarcely marred by rubbing with a steel wool (#0000). The Taber abrasion test (ASTM-D1044-56; truck wheel, CS-10F; load, 500 g ×2; 50 revolutions) of the coated film gave a haze value of 5.0% in contrast to 55% for the uncoated polyethylene terephthalate film, revealing an outstanding improvement in the abrasion resistance.

A strip, 1 cm width and 14 cm length, was cut out from the coated film, and stretched with an Instron® tensile tester under conditions of an initial grip separation of 10 cm, and rates of grip separation of 2 cm/min, 5 cm/min, or 10 cm/min. The elongations at which the coating layers start to crack were 30% in all cases.

EXAMPLES 2-4, COMPARATIVE EXAMPLES 1-7

Drawn polyethylene terephthalate films of 75 microns thickness having coating layers of 3 microns thickness were prepared by using a cyanurate ring-containing acrylate of the Synthetic Example 2 (hereinafter called as compound B), the following acrylates synthesized by similar methods to the Synthetic Examples 1 or 2 (hereinafter called as compounds C and D), and for comparison, conventional polyvalent acrylate compounds (E-K), under the curing conditions of the Example 1 except the compound D and the compound H which were cured by the ultraviolet irradiation in water.

Each of the above prepared coated films was subjected to the Taber abrasion test and the measurement of elongation at the crack generation (under the conditions of an initial grip separation of 10 cm and the rate of grip separation of 2 cm/min, using an Instron tensile tester). The results are shown in the figure wherein the abscissa and the ordinate indicate the haze value (%) after the Taber abrasion test and the elongation (%) respectively. As can be seen from the figure, the laminate of the present invention has excellent abrasion resistance and elongation.

[Structures of Compounds C-K]

Compound C: A compound having a structure corresponding to the condensation product of 1 cyanurate ring to, on the average, 2 acryloyloxyethyl groups and 0.33 cyanuric acid ester residue originated from trimethylolpropane which is a trihydric alcohol.
Compound D: Tris(2-acryloyloxypropyl)cyanurate
Compound E: Dipentaerythritol hexaacrylate
Compound F: Pentaerythritol tetraacrylate
Compound G: A urethane acrylate obtained by reacting 2 moles of m-xylylene diisocyanate, 1 mole of diethylene glycol, and 2 moles of pentaerythritol mixedacrylate (triacrylate content, 50%; NK-Ester A-TMM-3,3, product of Shin-Nakamura Kagaku K.K.)
Compound H: A mixture of acrylates consisting of 60% of dipentaerythritol hexaacrylate, 25% of trimethylolpropane triacrylate, and 15% of neopentylglycol diacrylate.
Compound I: Trimethylolpropane triacrylate
Compound J: Tris(2-acryloyloxyethyl)isocyanate
Compound K:

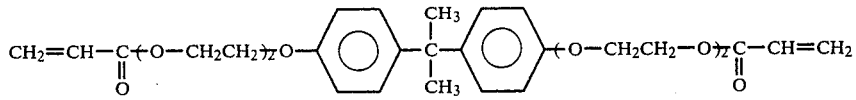

(NK-Ester ABPE-4; Product of Shin-Nakamura Kagaku K.K.)

EXAMPLE 5

107 Parts of a cyanurate ring-containing methacrylate having 2 methacryloxyethyl groups and 0.5 tetramethylene group per 1 cyanurate ring on the average was prepared as a viscous liquid, in a similar manner as the Synthetic Example 2, from 55.3 parts of cyanuric chloride, 195.2 parts (78.1 parts for the first step and 117.1 parts for the second step) of 2-hydroxyethyl methacrylate, 0.05 part of 2,6-di-tert-butyl-p-cresol, and 13.5 parts of 1,4-butanediol.

The coating liquid composed of 10 parts of the above cyanurate ring-containing methacrylate, 0.2 part of benzoyl peroxide, 4 parts of ethanol, and 6 parts of ethylene glycol monoethyl ether was applied to a polycarbonate film (obtained by the condensation polymerization of bisphenol A and phosgene) of 100 microns thickness, and cured at 140° C. for 4 minutes in a nitrogen atmosphere. The thickness of the cured coating film was 4 microns. The haze of the film after the Taber abrasion test was 7.5%, which, compared with the haze value of the original polycarbonate film of 53%, showed remarkable improvement in abrasion resistance. The elongation of the coated film was 35%.

EXAMPLE 6

The coating liquid composed of 10 parts of a cyanurate ring-containing acrylate obtained by the Synthetic Example 1 (Compound A), 3 parts of benzophenone, 1 part of triethanolamine, 4 parts of methyl isobutyl ketone, and 6 parts of xylene was applied to a polypropylene film of 25 microns thickness, dried with hot air at 80° C., and irradiated with ultraviolet rays for 2 minutes in air using a 2 KW high-pressure mercury-vapor lamp at a distance of 25 cm. A coated film having a cured coating layer of 2 microns thickness was obtained. The haze value of the coated film after the Taber abrasion test was 5.1%, in contrast with that of the uncoated polypropylene film of 67%. The elongation of the coated film was 45%.

EXAMPLE 7 AND COMPARATIVE EXAMPLE 8

The cyanurate ring-containing acrylate obtained by the Synthetic Example 1 (Compound A) and tris(2-acryloyloxyethyl)-isocyanurate (Compound J) which is an isomer of the Compound A, were applied separately to drawn polyethylene terephthalate films of 75 microns thickness in a similar manner as the Example 1 to obtain coated films having cured coating layers of 10 microns thickness. The films were almost free from curling. The haze value of the film having the layer of Compound A after the Taber abrasion test was 5%, and the film could be folded without breaking nor cracking at the folded part. In contrast to the above, the haze value of the film having cured Compound J coating layer after the Taber abrasion test was 9.2%, and the film could not be folded without breaking nor cracking at the folded part.

COMPARATIVE EXAMPLE 9

The coating solution composed of 10 parts of the cyanurate ring-containing acrylate obtained by the Synthetic Example 1 (Compound A), and 2 parts of benzoin ethyl ether was applied to a drawn polyethylene terephthalate film of 75 microns thickness with a doctor knife, and cured by ultraviolet-light irradiation for 2 minutes using a 2 KW high-pressure mercury-vapor lamp at a distance of 25 cm. The coated film thus prepared was considerably curled. The thickness of the cured coating layer was 20 microns. The haze value of the film after the Taber abrasion test was 5%, and the film was broken and cracked at the folded part by folding.

Industrial Applicability

The abrasion-resistant laminated film of the present invention can be used, for example, as a shatter-proof film for window glass, a sunlight-controlling film, a heat radiation reflective film, a plastic mirror, a display, a stamping foil, a show window glass, an explosion-proof layer for cathoderay tube, a label, a surface-protecting film for daily necessaries and miscellaneous goods, a surface-protecting film for various photographic films, magnetic tapes, drafting films, etc., a printing film, a plate-making material, a microfilm jacket, an agricultural film, etc. It is especially useful for the purpose which requires both high elongation and high abrasion resistance.

We claim:

1. A thermoplastic resin film laminate composed of a flexible thermoplastic resin film having a thickness of not more than 500 microns coated or laminated, on one or both sides thereof, with a high elongation and abrasion resistant vinyl polymer layer, which layer has a thickness of 0.5 to 1.5 microns and is composed mainly of a polymerized cyanurate ring-containing (meth)acrylate represented by the general formula (I) wherein the cyanurate ring-containing (meth) acrylate contains essentially not more than 1 weight percent of chlorine atoms

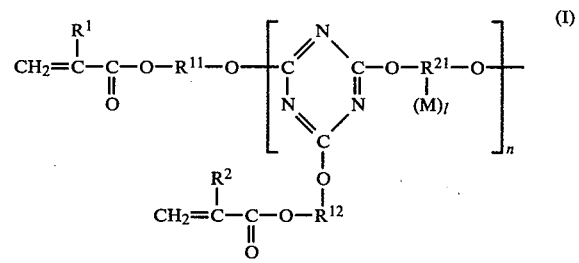

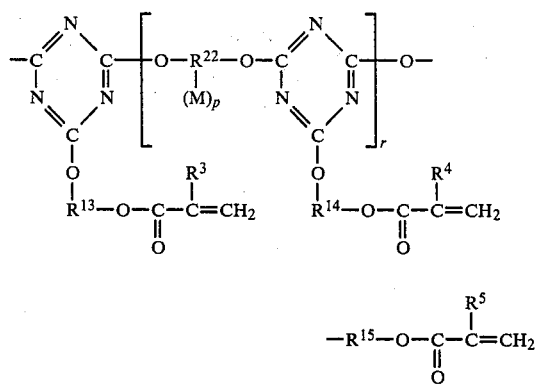

wherein $R^1$, $R^2$, $R^3$, $R^4$, and $R^5$ each represents a hydrogen atom or a methyl group; $R^{11}$, $R^{12}$, $R^{13}$, $R^{14}$, and $R^{15}$ each represents an alkylene group having a carbon number of 2 to 4; $R^{21}$ and $R^{22}$ each represents a 2-4 valent saturated hydrocarbon group having a carbon number of 2 to 6, wherein a part of the carbon atoms may be replaced by oxygen atoms forming ether linkages; M is —OH and/or a group

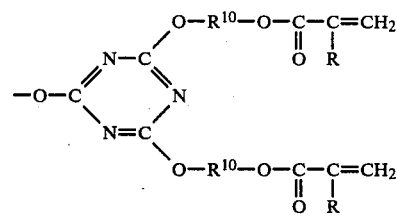

(wherein R is hydrogen atom or methyl group; $R^{10}$ is an alkylene group having a carbon number of 2 to 4); l is 0, 1 or 2; (l+2) is equal to the valence of $R^{21}$ and is an integer of 2 to 4; n is 0 or an integer of 1 to 3; p is 0, 1, or 2; (p+2) is equal to the valence of $R^{22}$ and is an integer of 2 to 4; when l or p is 2, both Ms may be the same or different; r is 0 or an integer of 1 to 3.

2. A thermoplastic resin film laminate of claim 1, wherein the cyanurate ring-containing (meth)acrylate is a compound of the formula (II)

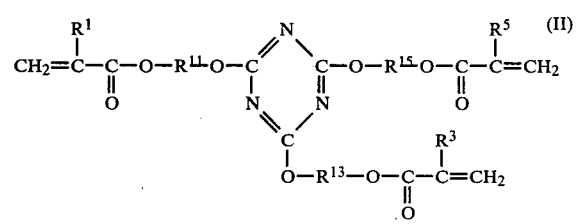

wherein $R^1$, $R^3$, and $R^5$ each represents a hydrogen atom or a methyl group; $R^{11}$, $R^{13}$, and $R^{15}$ each represents an alkylene group having a carbon number of 2 to 4.

3. A thermoplastic resin film laminate of claim 1, wherein the cyanurate ring-containing (meth)acrylate is a compound of the formula (III)

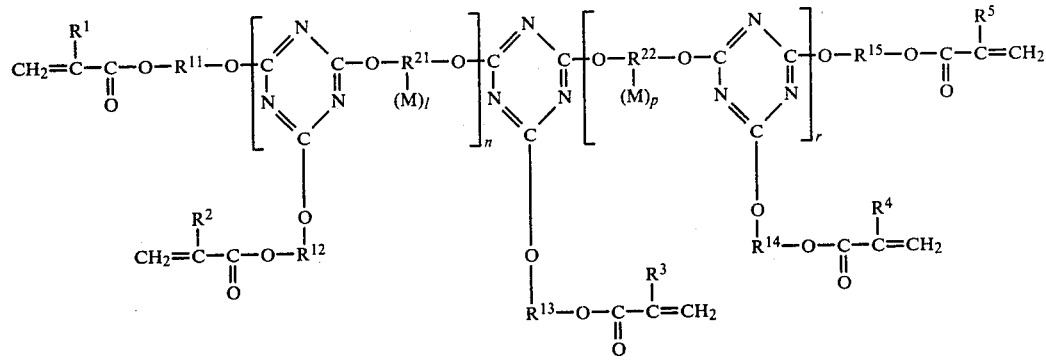 (III)

wherein $R^1$-$R^5$ each represents a hydrogen atom or a methyl group; $R^{11}$-$R^{15}$ each represents an alkylene group having a carbon number of 2 to 4; $R^{21}$ and $R^{22}$ each represents a 2-4 valent saturated hydrocarbon group having a carbon number of 2 to 6, wherein a part of the carbon atoms may be replaced by oxygen atoms forming ether linkages; M is a group

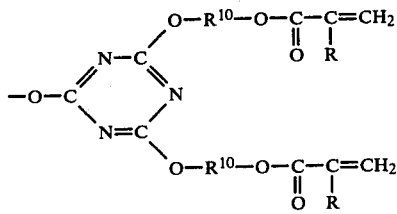

(wherein R is hydrogen atom or methyl group; $R^{10}$ is an alkylene group having a carbon number of 2 to 4); l and p are 0 or 1; n and r each represents 0 or an integer of 1-3, and (n+r) is an integer of 1-3.

4. A thermoplastic resin film laminate as claimed in any one of claims 1, 2 or 3, wherein the thermoplastic resin is an aromatic polyester or a polycarbonate.

5. A thermoplastic resin film laminate of claim 1, wherein said thermoplastic film is formed of a member selected from the group consisting of aromatic polyesters, polyolefins, polyamides, polyimides, cellulose derivatives, polycarbonates, polyvinylchloride, polystyrene, acrylic ester copolymers, methacrylic ester copolymers, polyethers, polyester ether resins, copolymers thereof and poly blends thereof.

6. A thermoplastic resin film laminate of claim 1, wherein said vinyl polymer layer has a thickness of 1.0 to 10 microns.

* * * * *